United States Patent [19]

Akagiri

[11] Patent Number: 5,294,925
[45] Date of Patent: Mar. 15, 1994

[54] DATA COMPRESSING AND EXPANDING APPARATUS WITH TIME DOMAIN AND FREQUENCY DOMAIN BLOCK FLOATING

[75] Inventor: Kenzo Akagiri, Kanagawa, Japan

[73] Assignee: Sony Corporation, Tokyo, Japan

[21] Appl. No.: 934,004

[22] Filed: Aug. 21, 1992

[30] Foreign Application Priority Data

Aug. 23, 1991 [JP] Japan .................................. 3-235613

[51] Int. Cl.⁵ ............................................. H03M 7/30
[52] U.S. Cl. ........................................ 341/50; 381/37
[58] Field of Search .................................... 341/50, 51

[56] References Cited

U.S. PATENT DOCUMENTS

| | | | |
|---|---|---|---|
| 4,972,484 | 11/1990 | Theile et al. | 381/37 |
| 5,049,992 | 9/1991 | Citta et al. | 358/140 |
| 5,115,240 | 5/1992 | Fujiwara et al. | 341/51 |
| 5,142,656 | 8/1992 | Fielder et al. | 381/37 |
| 5,166,686 | 11/1992 | Sugiyama | 341/155 |

*Primary Examiner*—Marc S. Hoff
*Attorney, Agent, or Firm*—Limbach & Limbach

[57] ABSTRACT

The input digital signal is divided into blocks each composed of a number of samples, and first block floating is applied to each block. The each first block floating processed block is orthogonally transformed to provide spectral coefficients. The spectral coefficients are divided into bands, each band including at least one spectral coefficient. Second block floating is applied to each band to provide a second block floating processed band. Each of the second block floating processed bands is adaptively quantized by the adaptive bit allocation circuit. Common circuitry or processing is used to determine the block size and to apply block floating, which reduces the complexity of the hardware and/or the number of processing steps required.

20 Claims, 10 Drawing Sheets

DATA COMPRESSING AND EXPANDING APPARATUS WITH TIME DOMAIN AND FREQUENCY DOMAIN BLOCK FLOATING

FIELD OF THE INVENTION

This invention relates to an apparatus for applying data compression and expansion to an input digital signal in which the input digital signal is data compressed by the data compression apparatus and the resulting data compressed digital signal is transmitted or recorded. The transmitted or recorded signal is then reproduced and data expanded by the expander to provide a playback signal. More particularly, it relates to a digital signal data compression apparatus and a digital signal data expansion apparatus in which digital signals are processed with block floating in both the time domain and the frequency domain.

BACKGROUND OF THE INVENTION

Data compression techniques are known in which a digital audio or similar signal is divided in the time domain into blocks, each block is transformed using an orthogonal transform, and the resulting spectral coefficients are divided into plural bands of plural spectral coefficients. Block floating is applied to each band of the resulting spectral coefficients and each band of spectral coefficients is quantized. Information concerning the block floating and the information concerning quantization is transmitted or recorded on a recording medium simultaneously with the quantized data.

Block floating is a normalization process applied to a block of data comprising plural words, such as a band of plural spectral coefficients. Block floating is applied by multiplying each word in the data block by a common value for the data block to improve quantization efficiency. In a typical block floating process, the maximum absolute value of the words in the data block is found and is used as a block floating coefficient common to all the words in the data block. Using the maximum absolute value in the band as the block floating coefficient prevents data overflow because the absolute value of no other word in the data block can be greater than the maximum absolute value. A simplified form of block floating determines the block floating coefficient using a shift quantity, which provides block floating in 6 dB steps.

The orthogonal transform is normally carried out using a word length that is selected to be long enough so that a required accuracy can be achieved for any input data without using block floating. If the orthogonal transform is to be carried out without lowering the accuracy of the input data, a large word length is required. This results in increased hardware complexity and increased cost.

It is also known to improve analysis accuracy of the orthogonal transform by performing the orthogonal transform on the input signal divided into blocks having a variable block size. The block size is selected depending on the dynamic properties of the input signal. In some instances, the mean square value of the difference between adjacent samples of the input signal is used as a judgment index for determining the block size. The need to determine the judgment index exclusively for deciding on the block size for the orthogonal transform increases the number of processing steps.

In addition, when block floating is applied using the maximum absolute value of the words in the data block as the block floating coefficient, the absolute value of each word in the block is determined. Then, a sequence of determining whether the absolute value of the current word is greater than the maximum absolute value of the words already examined is repeated for all of the words in the data block. This results in an increased number of steps of the operating program and prolonged operating time.

FIG. 1 shows a flow chart of a conventional block floating program that applies block floating to a data block composed of plural words, for example, a band of spectral coefficients. Referring to FIG. 1, the absolute value of the current word is calculated at step S1. At the next step S2, the absolute value of the current word is compared to the maximum absolute value of the words in the data block already examined. If the maximum value of the current word is larger than the maximum absolute value, the current word is exchanged with the maximum absolute value at step S3, and becomes the new maximum absolute value, and the program proceeds to step S4. Otherwise, the program proceeds directly to step S4. Step S4 determines whether all of the words in the block have been processed. If the result is NO, the program reverts to step S1 and, if the result is YES, the program proceeds to the normalizing processing of step S5 onwards.

At step S5, the maximum absolute value for the block is shifted by one bit to the left. The most significant bit of the shifted word is tested at step S6. If the most significant bit is not a 1, the program reverts to step S5. The left shift process is repeated until the most significant bit of the shifted word is determined to be a 1 at step S6. The number of shifts immediately preceding the detection of a 1 is stored as the shift quantity, which can serve as the block floating coefficient. At the next step S7, each word in the block is normalized by shifting it to the left by the stored shift quantity. Step S8 checks whether all of the words in the data block have been normalized. If the result is NO, the program reverts to step S7 and, if the result is YES, the program terminates.

In the process just described, it is necessary to compare, for each word in the data block, the absolute value of the word with maximum absolute value of the words in the data block already examined. This requires a large number of the program steps and long processing time.

OBJECTS AND SUMMARY OF THE INVENTION

In view of the above-described state of the art, it is an object of the present invention to provide a digital data compression apparatus and a complementary data expansion apparatus in which the processing operations for the orthogonal transform, for determining the block size for the orthogonal transform, and for determining the block floating coefficients for block floating may be performed using a smaller number of steps and simpler, less costly, hardware.

To accomplish the above object, the present invention provides an apparatus for applying data compression to an input digital signal comprising plural samples to provide an output signal. The apparatus includes a first dividing circuit that divides the input digital signal into blocks. Each block includes plural samples. A first block floating circuit applies first block floating to each block to provide a first block floating processed block.

An orthogonal transform circuit orthogonally transforms each first block floating processed block to provide spectral coefficients. A second dividing circuit divides the spectral coefficients into bands. Each band includes at least one spectral coefficient. A second block floating circuit applies second block floating to each band to provide a second block floating processed band. Finally, the apparatus includes a circuit that adaptively quantizes each second block floating processed band to provide a quantized band, and provides the quantized bands as the output signal.

The first block floating coefficient produced by the first block floating applied to each block is summed with each of the second block floating coefficients resulting from applying block floating to the spectral coefficients resulting from the transform of the block to produce a summed block floating coefficient. The summed block floating coefficient is transmitted to the expander apparatus.

In a data compression apparatus according to the invention, the word length subject to the orthogonal transform processing operation may be reduced as a result of the block floating processing applied to the blocks of input digital data before the orthogonal transform. The orthogonal transform block size may be determined using the same index as that used to determine the first block floating coefficient. This reduces the amount of processing required. If a coarse block floating resolution of 6 dB is sufficient, a shift quantity, determined by ORing the absolute values of the words in the block, may be used as the block floating coefficient. This eliminates the necessity of finding the maximum absolute value in the block and enables block floating to be applied using fewer processing steps.

The present invention also provides a data expansion apparatus that provides a decoded output signal by expanding a compressed digital signal generated from a input digital signal by a data compression process. The process includes the steps of dividing the input digital data into blocks, each block including plural samples; applying first block floating to each block to provide a first block floating processed block; orthogonally transforming each first block floating processed block to provide spectral coefficients; dividing the spectral coefficients into bands, each band including at least one spectral coefficient; applying second block floating to each band to provide a second block floating processed band; adaptively quantizing each second block floating processed band to provide a quantized band; and providing the quantized bands as the compressed digital signal. The data expansion apparatus includes a circuit that receives the compressed digital data and dequantizes the quantized bands to provide plural second block floating processed bands. A circuit reverses the second block floating applied to each second block floating processed band to provide plural spectral coefficients. A circuit inversely orthogonally transforms the spectral coefficients to provide a first block floating processed block of plural samples. Finally, the expander includes a circuit that reverses the first block floating applied to the first block floating processed block to provide a block of the output signal.

The present invention also provides a method for recording a data-compressed digital signal derived from an input digital signal that includes plural samples by a on a recording medium. According to the method, the input digital signal is divided into blocks, each block includes plural samples. First block floating is applied to each block to provide a first block floating processed block, and each first block floating processed block is orthogonally transformed to provide spectral coefficients. The spectral coefficients are divided into bands, each band includes at least one spectral coefficient and second block floating is applied to each band to provide a second block floating processed band. Each second block floating processed band is adaptively quantized to provide a quantized band. The quantized bands are provided as the data-compressed digital signal, and the data compressed digital signal is recorded on the recording medium.

DETAILED DESCRIPTION OF THE INVENTION

Referring to the Figures, a technique for applying data compression to an input digital signal using adaptive transform coding (ATC), a combination of sub-band coding (SBC) and adaptive transform coding (ATC), and adaptive bit allocation (APC-AB), according to the present invention, will be described.

Figure 1:
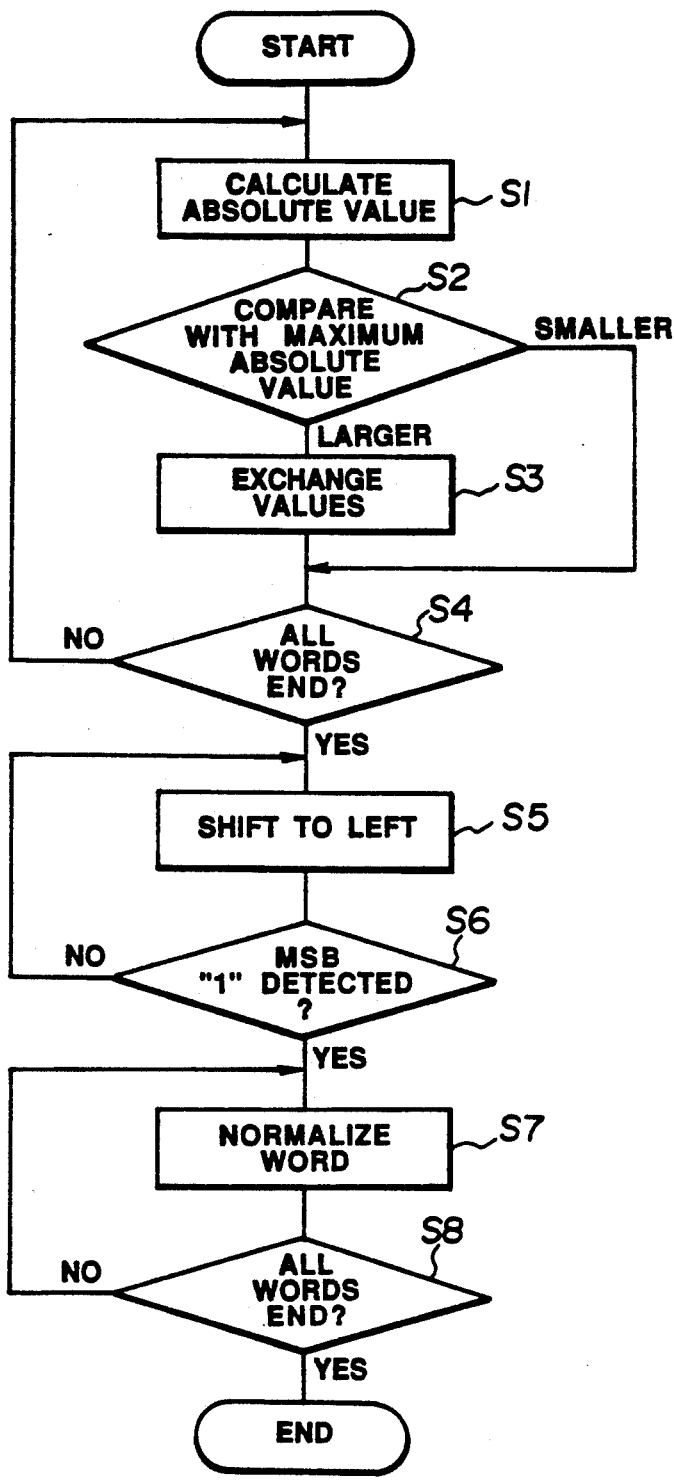
FIG. 1 is a flow chart showing an example of a conventional block floating processing sequence.
Figure 2:
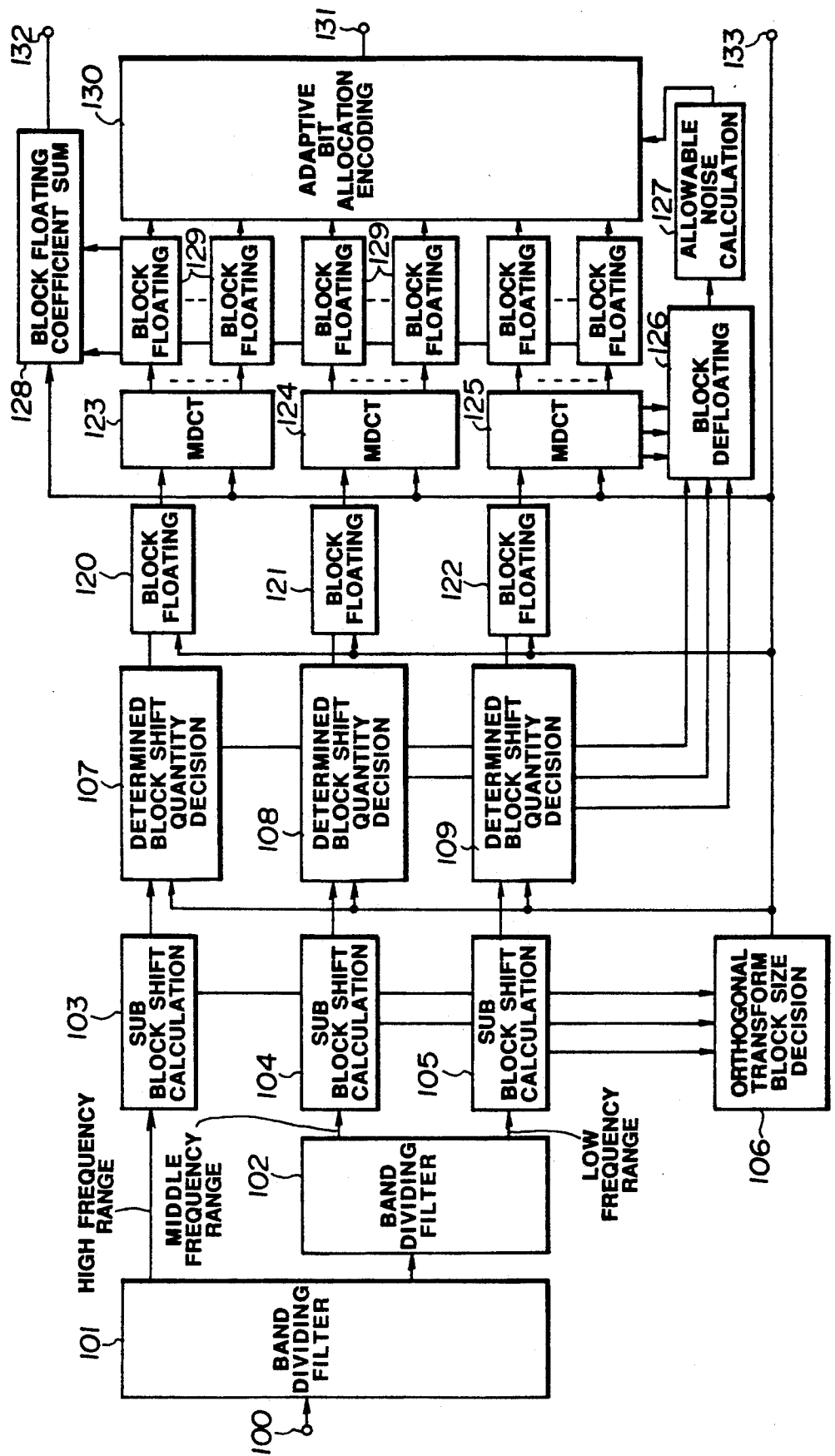
FIG. 2 is a block circuit diagram showing a data compression apparatus according to an embodiment of the present invention.

In the practical data compression apparatus shown in FIG. 2, an input digital signal is divided by, e.g., a filter, into plural frequency ranges. The bandwidths of the frequency ranges are broader towards higher frequencies. Each resulting frequency range signal is then orthogonally transformed to produce plural spectral coefficients in the frequency domain.

The resulting spectral coefficients are divided into plural critical bands, and quantizing bits are allocated to each critical band to quantize the spectral coefficients in the critical band. Dividing the spectral coefficients into critical bands enables the masking characteristics of the human auditory sense to be taken into account, as will be described below. Higher frequency critical bands may each be divided into plural sub bands. The sub bands, which can be divided using a filter or the like, may have equal width.

In the present embodiment, the block size for the orthogonal transform is adaptively changed prior to the orthogonal transform in response to the dynamic characteristics of the signal prior to the transform. Block floating is applied to each block.

Referring to FIG. 2, an input digital signal, such as an audio PCM signal in the frequency range of 0 Hz to 20 kHz, is supplied to the input terminal 100. The input signal is divided by the band-dividing filter 101, which is preferably a Quadrature Mirror Filter (QMF filter), into two frequency ranges, one from 0 Hz to 10 kHz, and one from 10 to 20 kHz. The signal in the frequency range of 0 Hz to 10 kHz is subdivided by the band-dividing filter 102, which is also preferably a QMF filter, into a frequency range of 0 Hz to 5 kHz and a frequency range of 5 to 10 kHz.

Quadrature Mirror Filters are discussed in, for example, R. E. Crochiere, *Digital Coding of Speech in Subbands*, 55 BELL SYST. TECH. J., No. 8, (1976). The technique of dividing a frequency spectrum into equal-width frequency ranges is discussed in Joseph H. Rothweiler, *Polyphase Quadrature Filters-A New Subband Coding Technique*, ICASSP 83 BOSTON.

The block size decision circuit 106 determines the division, in the time domain, of the each of the frequency range signals into blocks having a block size determined in response to sub block shift quantities calculated for each of the frequency range signals by the sub block shift calculation circuits 103 through 105. The operating of this circuit will be described in more detail below.

The high frequency range signal in the frequency range of 10 kHz to 20 kHz from the filter 101 is processed by the sub block shift calculating circuit 103. In this circuit, the absolute value of each sample in sub blocks of the high frequency range signal is determined. A logical OR operation is carried out on the resulting absolute values in each sub block. A left shift operation is carried out on the logical sum to provide a sub block shift quantity or sub block floating coefficient.

The determined block shift quantity calculating circuit 107 calculates a first shift quantity for blocks of the high frequency range signal, each block having a block size determined by the block size decision circuit 106. The circuit 107 calculates the first shift quantity from the sub block shift quantities received from the sub block shift quantity calculating circuit 103. The circuit 107 compares the sub block shift quantities of all the sub blocks in the block with one another, and selects the smallest sub block shift quantity as the first block shift quantity.

The first block floating circuit 120 then applies first block floating to blocks of the high frequency range signal, each block having a block size determined by the block size decision circuit. The first block floating circuit uses the first block shift quantity determined by the determined block shift quantity decision circuit 107 as the first block floating coefficient or first shift quantity for the block. The modified discrete cosine transform (MDCT) circuit 123 then orthogonally transforms the first block floating processed high frequency range signal in blocks, each block having a block size determined by the block size decision circuit 106.

The middle frequency range signal in the frequency range of 5 kHz to 10 kHz from the filter 102 is processed by the sub block shift calculating circuit 104. In the circuit 104, the absolute value of each sample in sub blocks of the middle frequency range signal is determined. A logical OR operation is carried out on the resulting absolute values in each sub block. A left shift operation is carried out on the logical sum to provide a sub block shift quantity.

The determined block shift quantity calculating circuit 108 calculates a first block shift quantity for blocks of the middle frequency range signal, each block having a block size determined by the block size decision circuit 106. The circuit 108 calculates the first block shift quantity from the sub block shift quantities received from the sub block shift quantity calculating circuit 104. The circuit 108 compares the sub block shift quantities of all the sub blocks in the block with one another, and selects the smallest sub block shift quantity as the first block shift quantity.

The first block floating circuit 121 then applies first block floating to blocks of the middle frequency range signal, each block having a block size determined by the block size decision circuit 106. The first block floating circuit uses the first block shift quantity determined by the determined block shift quantity decision circuit 108 as the first block floating coefficient or shift quantity for the block. The modified discrete cosine transform (MDCT) circuit 124 then orthogonally transforms the first block floating processed middle frequency range signal in blocks, each block having a block size determined by the block size decision circuit 106.

The low frequency range signal in the frequency range of 0 Hz to 5 kHz from the filter 102 is processed by the sub block shift calculating circuit 105. In this circuit, the absolute value of each sample in sub blocks of the low frequency range signal is determined. A logical OR operation is carried out on the resulting absolute values in each sub block. A left shift operation is carried out on the logical sum to provide a sub block shift quantity.

The determined block shift quantity calculating circuit 109 calculates a first block shift quantity for blocks of the low frequency range signal, each block having a block size determined by the block size decision circuit 106. The circuit 109 calculates the first shift quantity from the sub block shift quantities received from the sub block shift quantity calculating circuit 105. The circuit 109 compares the sub block shift quantities of all the sub blocks in the block with one another, and selects the smallest sub block shift quantity as the first block shift quantity.

The first block floating circuit 122 then applies first block floating to blocks of the low frequency range signal, each block having a block size determined by the block size decision circuit 106. The first block floating circuit uses the first block shift quantity determined by the determined block shift quantity decision circuit 109 as the block floating coefficient or shift quantity for the block. The modified discrete cosine transform (MDCT) circuit 125 then orthogonally transforms the first block floating processed low frequency range signal in blocks having a block size determined by the block size decision circuit 106.

In each of the frequency ranges, the sub blocks are preferably 2.5 ms long.

The above-mentioned modified discrete cosine transform (MDCT) is discussed in, for example, J. P. Princen and A. B. Bradley, *Subband/Transform Coding Using Filter Bank Based on Time Domain Aliasing Cancellation*, ICASSP 1987.

Figure 3:
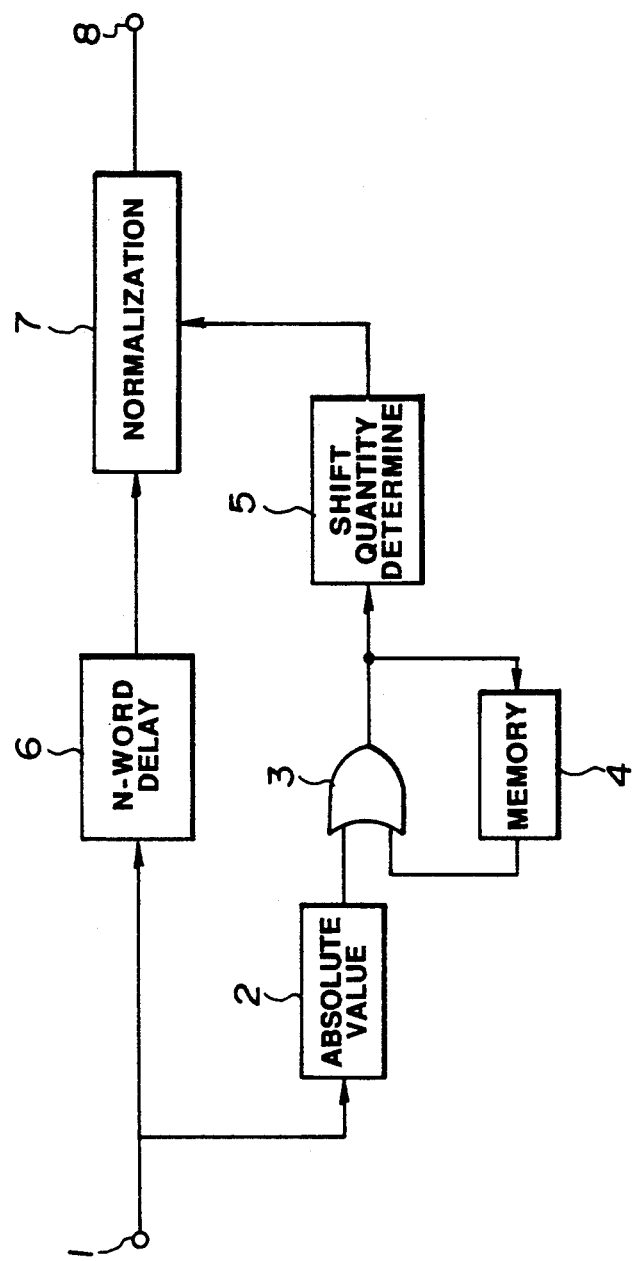
FIG. 3 is a block circuit diagram for illustrating the operation of block floating processing according to the present invention.

The block floating processing performed in the circuit blocks 103 through 105, 107 through 109, and 120 through 122 will next be described by referring to FIG. 3. An input signal, such as a frequency range signal from one of the band dividing filters 101 and 102, is supplied to the input terminal 1. The input signal is connected to the absolute value calculating circuit 2 where the absolute value of each word of the input signal is calculated. The absolute value of each word is transmitted to one input of the OR circuit 3, which provides logical sum processing. The logical sum output from the OR circuit 3 is supplied to the memory 4, where it is stored for one cycle of the data input clock (not shown). The logical sum output is returned from the memory 4 to the other input of the OR circuit 3 where it is ORed with the absolute value of the current word from the absolute value calculating circuit 2. The logical sum output from the OR circuit 3 is delayed by one word in the memory 4 and is ORed with the current word, so that the words in the input signal are sequentially and cumulatively ORed. The memory 4 is reset (cleared to zero) each time the number of words entered into it corresponds to the number of words, N, in the data block to which block floating is being applied, e.g., a 2.5 ms sub block. This way, the absolute values of the N words in the data block are ORed.

The logical sum from the OR circuit 3 is transmitted to the shift quantity determining circuit 5. The circuit 5 determines the number of 0s in the logical sum between the Most Significant Bit (MSB) and the highest order bit that is a 1. Alternatively, the detection circuit detects the number of left shifts required to make the MSB a 1.

A bit in the logical sum of the words in a data block is a 1 if the bit is a 1 in one word in the data block, and is a 0 only if the bit is a 0 in every word in the data block. Therefore, for each 0 in the logical sum between the MSB and the highest order 1, in every word in the data block there is a 0 between the MSB and the highest order 1. This means that the effective number of bits in the logical sum, i.e., the number of bits remaining in the logical sum after the 0s between the MSB and the highest order 1 are discarded, is equal to the effective number of bits in the maximum word in the data block. Therefore, the shift quantity obtained by shifting the logical sum to the left until the MSB is a 1 is equal to the shift quantity determined using the maximum absolute value in the block.

The input signal from the input terminal 1 is also supplied to the normalizing circuit 7 via the N-word delay circuit 6, where N is the number of words in the data block. The delay circuit enables the shift quantity for each data block to be determined before the shift quantity is used to normalize the data block. The shift quantity from the shift quantity determining circuit 5 is also supplied to the normalizing circuit 7. The normalizing circuit 7 shifts each word in the data block to the left by the shift quantity and thereby normalizes the words in the data block. A predetermined number of bits may be subsequently taken from the MSB side by means of, for example, a requantizer. The block floating processed data blocks of input signal are supplied from the normalizing circuit 7 to the terminal 8.

Figure 4:
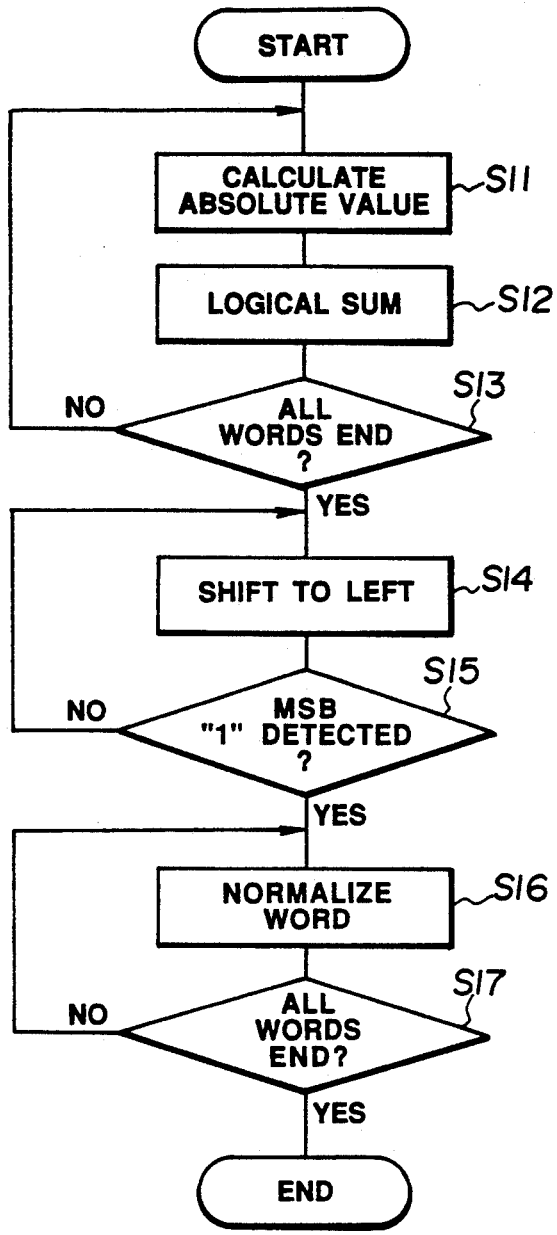
FIG. 4 is a flow chart for illustrating the operation of the block floating processing according to the present invention.

FIG. 4 is a flow chart showing the sequence of applying block floating to the words in a data block using a software routine. Referring to this Figure and to FIG. 3, in a step equivalent to the absolute value calculating circuit 2, the absolute value of each word is calculated at step S11. The logical sum operation is performed at the next step S12, emulating the OR circuit 3. The next step S13 determines whether the operation has been carried out on all of the N words in the data block. If the result is NO, the program returns to step S11. If the result is YES, i.e., if the logical sum operation has been performed on all of the words in the data block, the program proceeds to the next step S14.

The steps S14 and S15 are equivalent to the shift quantity determining circuit 5. Thus, the logical sum determined in step S12 is left shifted one bit in step S14, and step S15 checks whether the MSB of the shifted logical sum is a 1.

If the result is NO, i.e., if the MSB is not a 1, the program returns to step S14. If the result is YES, the program proceeds to step S16.

The steps S16 and S17 are equivalent to the normalizing circuit 7. Words are normalized at step S16, and step S17 checks whether all of the N words in the data block have been normalized. If the result is NO, the program returns to step S16 and, if the result is YES, i.e., if all of the words in the data block have been normalized, the program terminates.

Thus, by using the block floating processing just described, the present embodiment eliminates the complex operation of finding the maximum absolute value in the block, as is required in the conventional practice. The block floating coefficient, i.e., the shift quantity, is determined by the simple process of ORing the absolute values of the words in the data block, e.g., the words in each sub block, instead of determining the maximum absolute value of the words in the data block. This reduces the number of steps required when the operation is carried out using a microprocessor and a software routine. Accordingly, a satisfactorily high processing speed may be achieved.

The frequency range signals are not orthogonally transformed blocks having a randomly-varying size. Instead, each frequency range signal is divided into equal length frames, and the orthogonal transforms are carried out on the frequency range signals in blocks obtained by dividing each frame by two raised to a positive integral power of at least zero.

Figure 5:
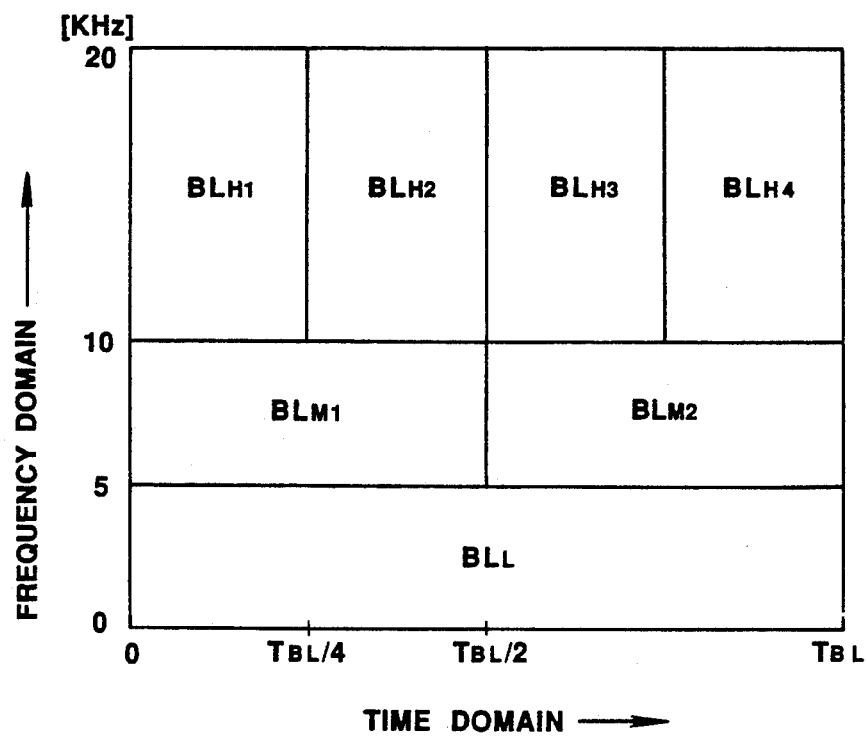
FIG. 5 shows a practical example of how the input digital signal is divided into frequency ranges and how the frequency ranges are divided into blocks in the time domain.

FIG. 5 shows a practical example of how the input digital signal is divided in the frequency domain into frequency ranges signals in three frequency ranges, and how a frame of the input digital signal is divided in the time domain into blocks in each of the frequency ranges. The resulting frequency range signals are supplied to the MDCT circuits 123, 124 and 125 of FIG. 2. In the practical example of FIG. 5, the bandwidths of the frequency ranges are wider, and time resolution is increased by dividing each frame into a greater number of blocks, towards higher frequencies. For example, for the low frequency range signal in the frequency range 0 Hz to 5 kHz the frame is divided into a single block $BL_L$ that includes 256 samples. For the middle frequency range signal in the frequency range of 5 to 10 kHz, the frame can be divided into two blocks $BL_{m1}$ and $BL_{M2}$, which are one-half the length of the block $BL_L$, or $T_{BL}/2$ long. Finally, for high frequency range signals in the frequency range of 10 to 20 kHz, the frame can be further divided, that is, blocks $BL_{H1}$, $BL_{H2}$, $BL_{H3}$ and $BL_{H4}$ are used, each of which are one-fourth the length of the block $BL_L$, or $T_{BL}/4$ long.

If the input digital signal has a frequency range of 0 Hz to 22 kHz, the low frequency range signals are in the frequency range of 0 Hz to 5.5 kHz, and the middle and high frequency range signals are in the frequency ranges of 5.5 kHz to 11 kHz and 11 to 22 kHz, respectively.

The block size decision circuit 106 receives sub block shift quantities for each sub block of each frequency range signal from the sub block shift quantity calculating circuits 103, 104 and 105. The block size decision circuit groups together the sub block shift quantities for each frequency range signal over a period of 20 ms. The circuit 106 determines whether there is a significant decrease of, for example, more than 4 bits, in the shift quantity for any of the frequency range signals in the 20 ms period. If such a sharp decrease occurs, this indicates that the respective frequency range signal has undergone a significant increase in amplitude.

In the event of a large increase in signal amplitude, the block size decision circuit 106 provides a block size signal to at least one of the determined block shift quantity decision circuits 107 though 109, and to at least one of the MDCT circuits 123 through 125. The block size signal reduces the size of the block to which the first block floating is applied and that is orthogonally transformed to one-half or to one-fourth of a frame. The change in the block size may be controlled together or independently for each of frequency range signals from the band-dividing filters 101 and 102.

Referring again to FIG. 2, the spectral coefficients from the MDCT circuits 123 to 125 are block floating processed by a second block floating circuit 129. The second block floating is applied to the spectral coefficients in each critical band or to the spectral coefficients in sub bands obtained by dividing one or more of the higher frequency critical bands. The second block floating enables a more effective utilization of quantizing bits to be achieved. Although the second block floating may be performed using a 6 dB step size, it may also be performed in steps of less than 6 dB to increase the resolution the block floating. A finer resolution can be used since there are fewer spectral coefficients in each of the critical bands or sub bands to which the second block floating is applied than there are samples in each of the blocks to which the first block floating is applied.

In the present embodiment, the second block floating is carried out using a primary step size of 6 dB, and a secondary step size of 1.8 dB. In this, two additional bits are used to represent the incremental steps of 0 dB. 1.8 dB, 3.6 dB and 5.4 dB relative to the primary steps.

The first and second block floating coefficients are not separately supplied to the block floating coefficient output 132 of the apparatus. Instead, the block floating sum calculating circuit 128 adds the first block floating coefficient for each block to each of the second block floating coefficients resulting from orthogonally transforming the block, and provides summed block floating coefficients to the output terminal 132.

The processed spectral coefficients processed by the second block floating are transmitted to the adaptive bit allocation circuit 130. The adaptive bit allocation circuit also receives an allowable noise level for each critical band or sub band calculated by the allowable noise calculating circuit 127. The adaptive bit allocation circuit receives the processed spectral coefficients divided into critical bands and sub bands, and determines the number of quantizing bits to allocate to quantize the spectral coefficients in each critical band and sub band. This determination is made in response to the allowable noise level and the energy or peak value in each critical band and sub band. The adaptive bit allocation circuit 130 then re-quantizes the processed spectral coefficients using the number of bits allocated for quantizing the spectral coefficients in each critical band and sub band. The quantized spectral coefficients are provided to the output terminal 131.

The allowable noise calculating circuit 127 will now be described in detail. The allowable noise calculating circuit calculates an allowable noise level for each critical band or sub band from the energy in each critical band, taking account of masking. Before the circuit is described, the terms "masking" and "critical band" will be explained.

The invention takes advantage of a psychoacoustic property of the human auditory sense called "masking." Masking is a psychoacoustic phenomenon in which a sound is rendered inaudible, or "masked," by other sounds occurring simultaneously with, or slightly earlier than, or later than, the sound. Masking effects may be classed into time domain masking effects, that is, masking by sounds occurring earlier or later than the masked sound, and concurrent masking effects, which is masking is by simultaneously-occurring sounds having a frequency different from the frequency of the masked sound.

Masking enables a sound to render inaudible any noise within its time or frequency masking range. This means that in the presence of a signal that, when reproduced, produces a sound, a digital encoding system that produces quantizing noise may have quantizing noise levels that are high compared with the noise level that is allowable in the absence of the signal, provided that the quantizing noise lies within the masking range of the sound produced by the signal. Since relatively high levels of quantizing noise are allowable if masked by the sound resulting from the signal, the number of bits required to quantize the signal representing the sound, or parts of the signal, may be significantly reduced.

A critical band is a frequency band that takes advantage of the masking characteristics of the human auditory sense. A critical band is the band of noise that can be masked by a pure sound that has the same intensity as the noise and has a frequency in the vicinity of the frequency of the noise. The width of the critical band increases with increasing frequency of the pure sound. The entire audio frequency range of 0 Hz to 20 kHz can be divided into, for example, 25 critical bands.

Referring once more to FIG. 2, the spectral coefficients produced by the MDCT circuits 123 to 125 are first block floating processed. The first block floating is reversed by the defloating circuit 126, using the shift quantities supplied by the determined block shift quantity decision circuits 107 to 109. The resulting spectral coefficients are fed into the allowable noise calculation circuit 127, details of which are shown in FIG. 6.

Figure 6:
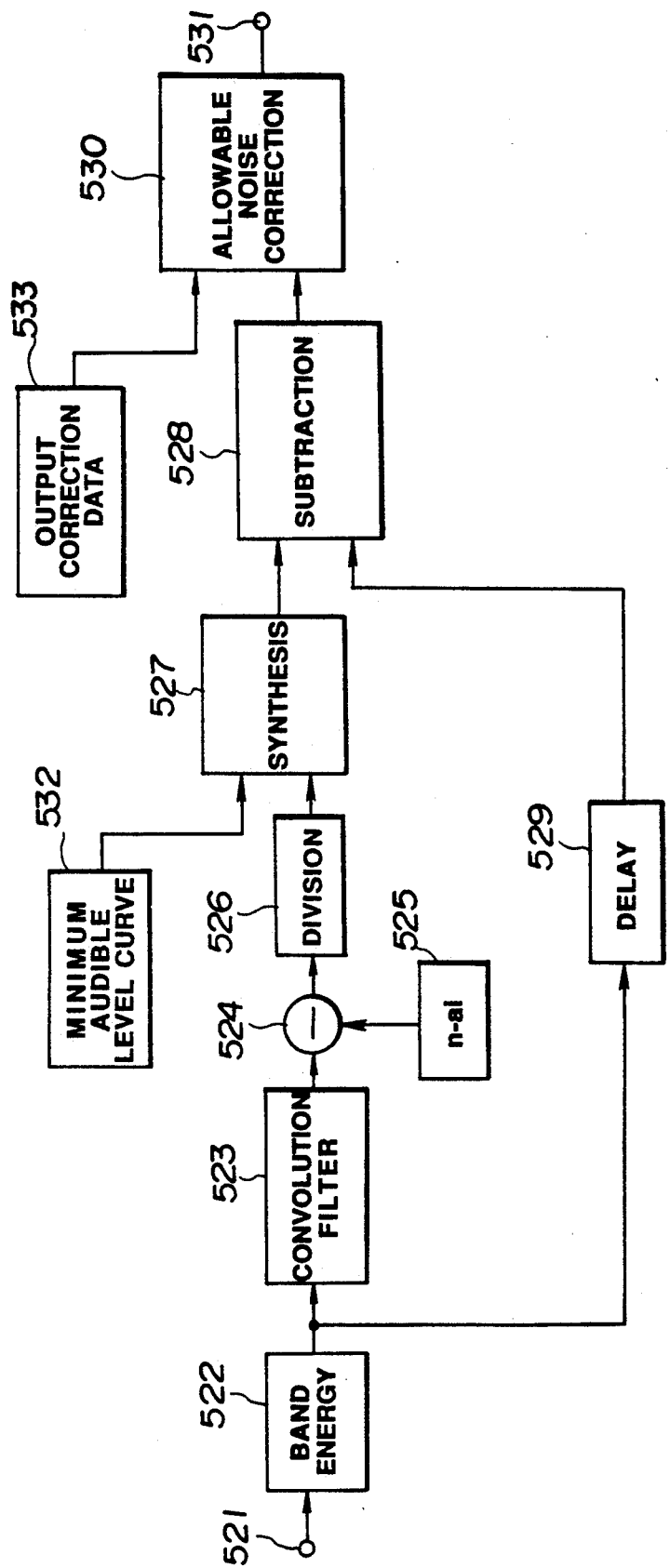
FIG. 6 is a block circuit diagram showing a practical example of the allowable noise calculating circuit of the apparatus of FIG. 2.

FIG. 6 is a block circuit diagram showing a schematic arrangement of a practical embodiment of the allowable noise calculating circuit 127. In FIG. 6, the spectral coefficients received by the input terminal 521 are fed into to the energy calculating circuit 522 in which the energy for each critical band is determined by calculating the sum of amplitudes of the spectral coefficients in each critical band. The peak or mean values of the amplitudes may also be used in place of the energy in each critical band.

Figure 7:
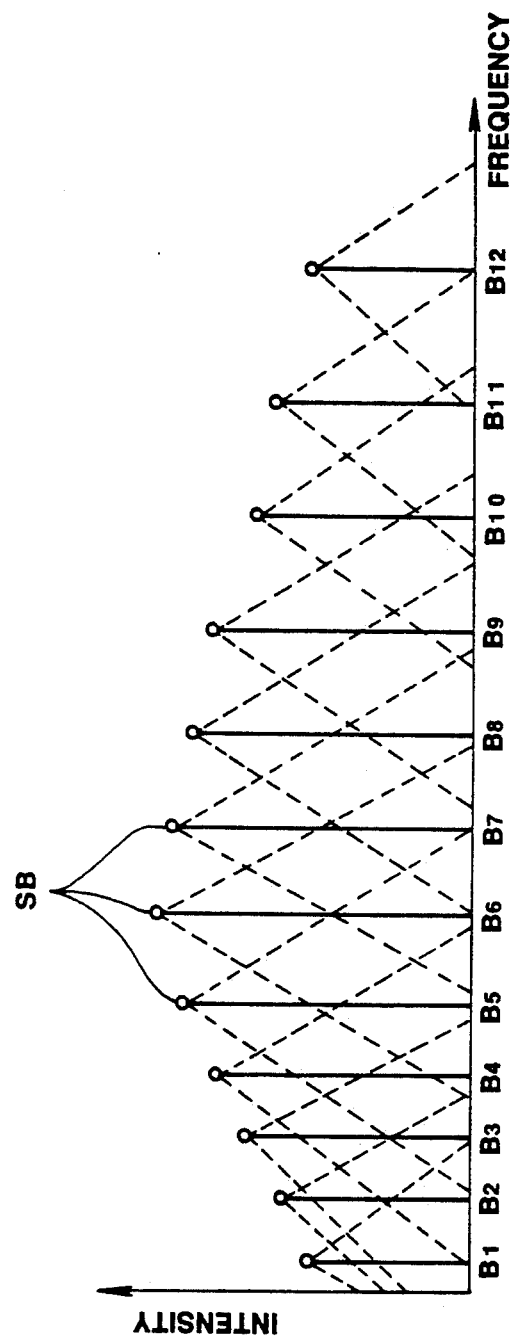
FIG. 7 shows a bark spectrum.

The spectrum of the energy in each critical band, as the output of the energy calculating circuit 522, is termed a bark spectrum. FIG. 7 shows such a bark spectrum SB. However, the number of the critical bands is reduced to 12 (for $B_1$ to $B_{12}$) in FIG. 7 to simplify the drawing.

A convolution operation is carried out to take account of the effect of the bark spectrum SB on the masking level in each critical band. In this, the bark spectrum is multiplied by predetermined filter coefficients and the resulting products are summed together. The outputs of the energy calculating circuit 522, i.e., the bark spectrum, are supplied to the convolution filter circuit 523 as input data. The convolution filter circuit includes plural delay elements for sequentially delaying the input data, plural multipliers, for example one multiplier for each of the 25 critical bands, for multiplying the outputs of the delay elements by a filter coefficient, and an adder for adding the outputs of the multipliers together. The convolution operation calculates the sum of the effects of the neighboring spectrum data indicated by broken lines in FIG. 7 on the masking level in each critical band.

In a practical example of the filter coefficients of the respective multipliers of the convolution filter circuit 523, if the coefficient of the multiplier M for a given band is 1, the outputs of the respective delay elements are multiplied by the filter coefficients 0.15, 0.0019, 0.0000086, 0.4, 0.06, and 0.007 by the multipliers M−1, M−2, M−3, M+1, M+2, and M+3, respectively. M is an arbitrary number of from 1 to 25.

The output of the convolution filter circuit 523 is supplied to a subtractor 524 that determines a level $\alpha$ corresponding to the allowable noise level in the convolved region. The level $\alpha$, corresponding to the allowable noise level in the convolved region, is a level that will give the allowable noise level for each critical band by deconvolution. This will be explained below. An admissible function, which represents the masking level, for finding the level $\alpha$ is supplied to the subtractor 524. The level $\alpha$ is controlled by increasing or decreasing the admissible function. The admissible function is supplied from a (n−ai) function generator 525, which will be described next.

The level $\alpha$ corresponding to the allowable noise level is determined by:

$$\alpha = S - (n - ai) \tag{1}$$

where i is the number of the critical band, 1 being the number of the lowest frequency critical band, n and a are constants, a is greater than 0, S is the intensity of the convolved bark spectrum, and (n−ai) is the masking function. In the example of FIG. 6, no deterioration in sound quality is obtained with n=38 and a=1.

The level $\alpha$ found in this manner is transmitted to the divider 526, which serves to deconvolve the level $\alpha$ in the convolved region. Thus, by deconvolution, the masking level may be found from the level $\alpha$. That is, the masking level for each critical band becomes the allowable noise level for the critical band.

Although deconvolution normally needs complex processing, it is carried out in the present embodiment by the simple divider 526.

The masking level is fed into the synthesis circuit 527, which additionally receives the minimum audible level curve RC from the minimum audible level curve generator 532.

Noise is inaudible if its absolute level is lower than the minimum audible level curve. The minimum audible level depends on the sound level at which the signal, after expansion and conversion to an analog signal, is reproduced. However, in a practical system, there are few, if any, significant differences in the way in which musical program material is fit within the dynamic range provided by a 16-bit PCM system. Thus, it can be said that if the quantization noise is inaudible at frequencies near 4 kHz, which is the frequency at which the ear is most sensitive, then, at other frequencies, quantization noise lower in level than the level of the minimum audible level curve will also be inaudible. Therefore, if it is assumed that the system is used such that the quantization noise near 4 kHz resulting from a certain quantizing word length is inaudible, and that the allowable noise level is obtained by synthesizing the minimum audible level curve RC and the masking level MS, then the allowable noise level in each critical band will be the greater of the level of the minimum audible level curve and the level of the masking level.

Figure 9:
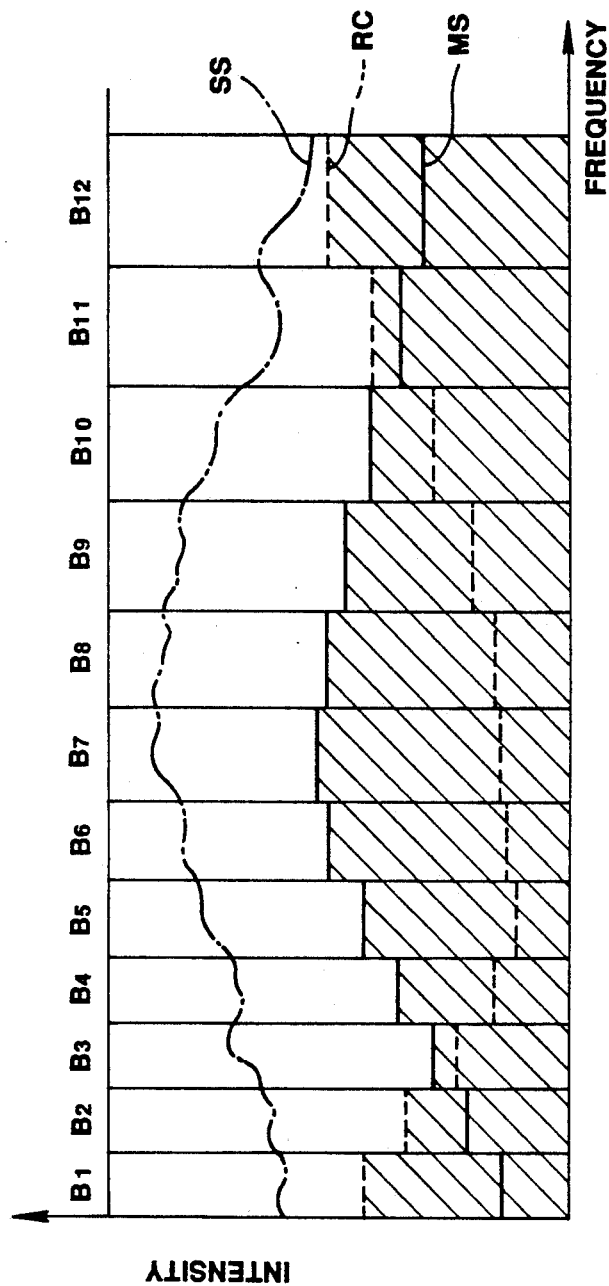
FIG. 9 shows the minimum audible level curve and the masking spectrum synthesized together.

An example of the resulting allowable noise level is shown by the hatched lines in FIG. 9. In the present embodiment, the level of the minimum audible level curve at 4 kHz is matched to the level corresponding to, e.g., the noise resulting from quantizing using 20 bits. FIG. 9 also shows the signal spectrum SS.

Figure 8:
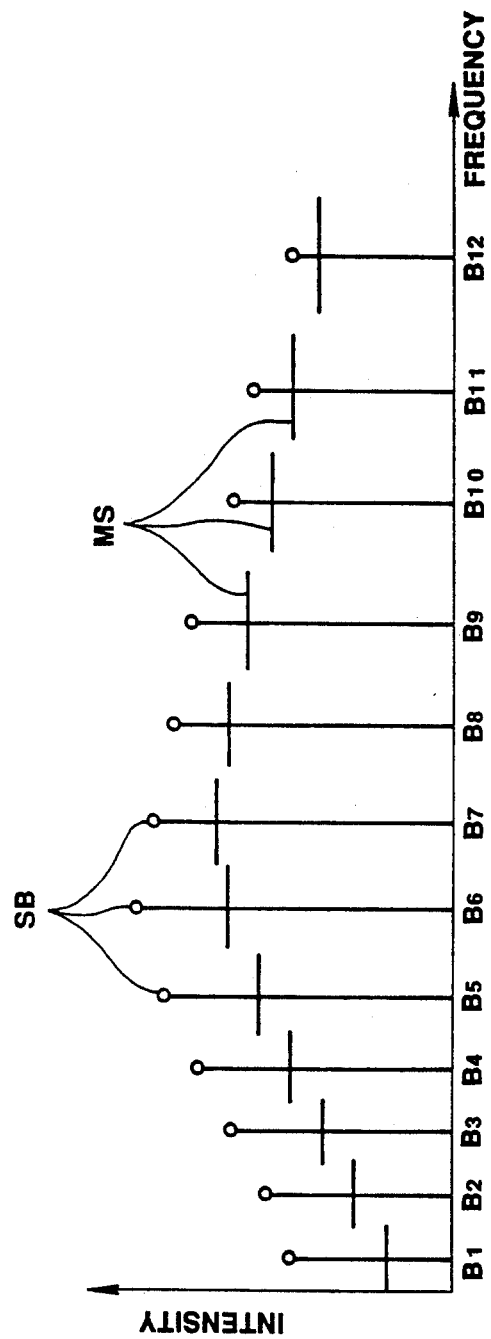
FIG. 8 shows a masking spectrum.

The allowable noise level from the synthesis circuit 527 is fed into the substractor 528, which also receives the output of the energy calculating circuit 522, i.e., the Burke spectrum SB, via the delay circuit 529. By the subtraction between the allowable noise level and the bark spectrum SB by the subtractor 528, the part of the bark spectrum SB below the level of the allowable noise level is masked, as shown in FIG. 8, in which the allowable noise level is shown by the lines MS.

The output of the subtractor 528 fed into the allowable noise correction circuit 530, which additionally receives the output of the output correction data circuit 533. The allowable noise correction circuit 530 corrects the allowable noise level at the output of the substractor 528 in response to, for example, equal loudness curve data provided by the output correction data circuit 533.

The equal loudness curve characterizes yet another psychoacoustic characteristic of the human auditory sense. The equal loudness curve corrects sound pressure levels at different frequencies so that they are perceived as sounding as loud as a pure sound at 1 kHz. The equal loudness curve has substantially the same characteristic as the minimum audible level curve shown in FIG. 9.

According to the equal loudness curve, a sound in the vicinity of 4 kHz is perceived as being as loud as a sound at 1 kHz having a sound pressure level 8 to 10 dB higher. On the other hand, a sound in the vicinity of 50 Hz must have a sound pressure level some 15 dB higher than a sound at 1 kHz sound to be perceived as sounding as loud. Because of this, the allowable noise level must be corrected using the equal loudness curve to adjust the allowable noise level for the loudness sensitivity of the human auditory sense.

The output correction data circuit 533 may also be used to correct the allowable noise level in response to the difference between the actual number of bits used by the adaptive bit allocation circuit 130 (FIG. 2) to quantize the processed spectral coefficients and the target number of bits, which is the total number of bits available for quantization. If the actual number of bits allocated by a previous adaptive bit allocation among the critical bands differs from the target number of bits, the allowable noise level must be changed to cause bits to be reallocated to reduce the difference to zero. For example, if the actual number of bits allocated is less than the target value, the output correction data circuit reduces the allowable noise level to a cause a number of bits equal to the difference between the actual number of bits and the target number of bits to be distributed among the critical bands to provide additional bits.

Alternatively, if the actual number of bits is more than the target number of bits, the output correction data circuit increases the allowable noise level to cause the number of bits corresponding to the difference between the actual number of bits and the target number of bits to be removed from the critical bands to remove excess bits.

To correct the actual number of bits, the difference between the actual number of bits and the target number of bits is measured and the output correction data circuit 533 provides error data that is used to correct the allowable noise level, and hence the numbers of bits used for quantization in the critical bands.

Alternatively, a number of bits equal to the target number of bits may be distributed from the outset among the critical bands in a fixed allocation pattern. As a further alternative, bit allocation may also be carried out depending on the amplitude of the signals in the respective critical bands. In this case, the noise energy may be minimized.

The output of the allowable noise correction circuit 530 is fed via the output terminal 531 to a ROM, not shown, where information concerning the numbers of quantizing bits is stored. The ROM stores sets of data indicating the numbers of quantizing bits to be allocated to each critical band and sub band for quantizing the processed spectral coefficients in each critical band and sub band. An appropriate one of the sets of data is selected in response to the output of the allowable noise correction circuit 530. Information concerning the numbers of quantizing bits is supplied from the ROM to the adaptive bit allocation circuit 130 (FIG. 2) where the processed spectral coefficients from the MDCT circuits 123, 124 and 125 are quantized with the numbers of quantizing bits allocated for quantizing the processed spectral coefficients in each critical band and sub band.

To summarize, the adaptive bit allocation encoding circuit 130 quantizes the processed spectral coefficients in each critical band and sub band with a number of quantizing bits allocated in response to the difference between the energy in the critical band or sub band and the allowed noise level.

The quantized spectral coefficients are provided at the output terminal 31. The quantized spectral coefficients are recorded on a suitable medium such as a read-only optical disc, a magneto-optical disc, a semiconductor memory, or a magnetic tape, or are transmitted, together with the summed block floating coefficients from the output terminal 132 and the block size information from the terminal 133.

Figure 10:
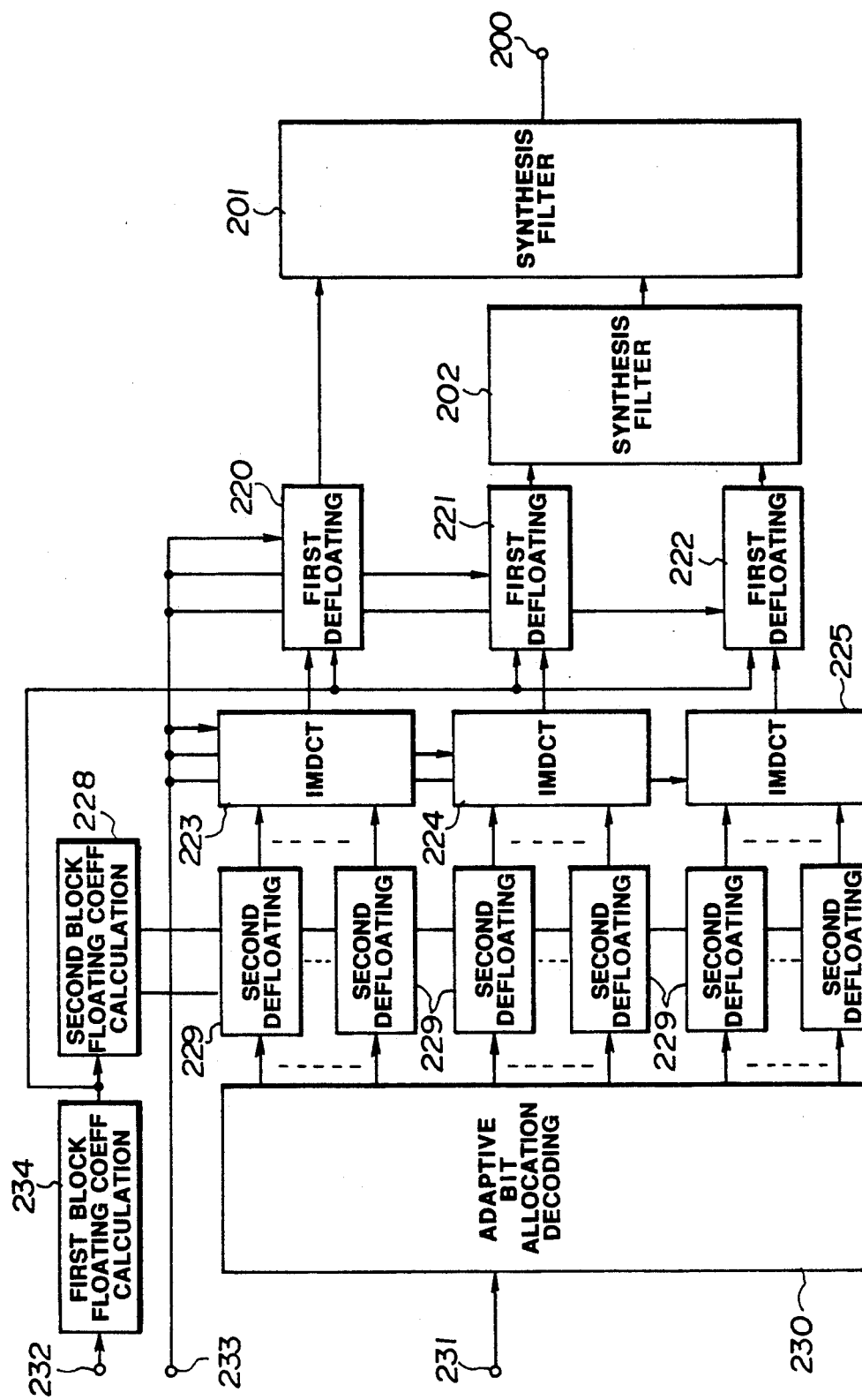
FIG. 10 is a block diagram showing a practical example of a complementary data expansion apparatus to which the present invention may be applied.

A complementary data expander is shown in FIG. 10. Quantized spectral coefficients from the output terminal 131 of the encoder shown in FIG. 2 are supplied to the input terminal 231. The quantized spectral coefficients are is first supplied to the adaptive bit allocation decoding circuit 230 for decoding. The resulting second block floating processed spectral coefficients are the supplied to the second defloating circuits 229, where the second block floating is reversed in each critical band and in sub-bands obtained by dividing higher frequency critical bands.

The shift quantities for reversing the second block floating are calculated in the following manner. The summed shift quantities from the terminal 132 of the data compressor (FIG. 2) are supplied to the input terminal 232 of the expander. The first block floating coefficient calculating circuit 234 determines the first block floating coefficient for reversing the first block floating by examining the summed block floating coefficients for all the critical bands and sub bands and finding the least block floating coefficient. Since at least one of the second block floating coefficients is zero, the least summed block floating coefficient will be the first block floating coefficient. The second block floating coefficient calculating circuit 228 determines the second block floating coefficient for each critical band and sub band by subtracting the first block floating coefficient found by the first block floating coefficient calculating circuit 234 from the summed block floating coefficient for each critical band and sub-band received from the encoder via the terminal 232.

The block size data from the terminal 133 of the encoder (FIG. 2) is supplied to the input terminal 233 of the decoder, and thence to the first block floating coefficient calculating circuit 234, to the first defloating circuits 220 through 222, and to the IMDCT circuits 223 through 225, which are inverse orthogonal transform circuits. The spectral coefficients from the second block defloating circuits are transformed into first block floating processed frequency range signals in the time domain by the IMDCT circuits 223 through 225. Each block of the first block floating processed frequency range signals is supplied to the first defloating circuits 220, 221 and 222 where the first block floating is reversed. The first defloating circuits 220 through 222 receive the first block floating coefficients they require to reverse the first block floating from the first block floating coefficient calculating circuit 234, and the block size data from the terminal 233.

The frequency range signals from the defloating circuits 221 and 222 are combined by the synthesizing filter 202. The frequency range signal from the defloating circuit 220 and the output of the synthesizing filter 202 are combined by the synthesizing filter 201 to provide a full frequency range output signal to the output terminal 200.

It should be noted that the present invention is not limited to the above embodiments, but may be applied to, for example, a signal processing apparatus for processing digital speech signals, besides audio PCM signals.

I claim:

1. Apparatus for applying data compression to an input digital signal comprising plural samples to provide an output signal, the apparatus comprising:
   a first dividing means for dividing the input digital signal into blocks, each block including plural samples;
   a first block floating means for applying first block floating to each block to provide a first block floating processed block;
   an orthogonal transform means for orthogonally transforming each first block floating processed block to provide spectral coefficients;
   a second dividing means for dividing the spectral coefficients into bands, each band including at least one spectral coefficient;
   a second block floating means for applying second block floating to each band to provide a second block floating processed band; and
   a means for adaptively quantizing each second block floating processed band to provide a quantized band, and for providing the quantized bands as the output signal.

2. The apparatus of claim 1, wherein:

the first block floating means is additionally for providing a first block floating coefficient for each block; and the second block floating means is additionally for providing a second block floating coefficient for each band; and the apparatus additionally comprises a means for providing summed block floating coefficients by adding the first block floating coefficient for a block to the second block floating coefficient for each band provided by orthogonally transforming the block after first floating processing; and a means for providing the summed block floating coefficients as a summed block floating coefficient output signal.

3. The apparatus of claim 1, wherein
each block includes a number of samples,
each band includes a number of spectral coefficients, and
the number of samples in each block is greater than the number of spectral coefficients in each band.

4. The apparatus of claim 1, wherein
the first block floating means is additionally for providing a first block floating coefficient, and for applying first block floating according to the first block floating coefficient, the first block floating coefficient including an effective number of bits,
the first block floating means applies first block floating with a first step size determined by changing the effective number of bits in the first block floating coefficient by one,
the second block floating means applies second block floating with a second step size, and
the first step size is greater than the second step size.

5. The apparatus of claim 1, wherein
each sample has an absolute value, and
the first block floating means includes a means for determining the first block floating coefficient of the block in response to the logical sum of the absolute values of samples in the block.

6. The apparatus of claim 1, wherein
the blocks each have a length, and
the apparatus additionally comprises a block size decision means for determining the length of each block in response to a block floating coefficient.

7. The apparatus of claim 6, wherein
the first block floating means comprises:
a sub block dividing means for dividing the input signal into sub blocks; and
a means for determining a sub block floating coefficient for each sub block; and
the block size decision means includes:
a means for receiving the sub block floating coefficients,
a block size signal generating means for generating a block size signal in response to an increase above a threshold value in the sub block floating coefficients of a plurality of sub blocks, and
the first dividing means divides the input signal into blocks, the blocks having a length determined by the block size signal.

8. The apparatus of claim 7, wherein the first dividing means divides the input digital signal into frames, and, in response to the block size signal, equally divides each frame by a factor of two raised to a positive integral power of at least zero to provide at least one block.

9. The apparatus of claim 7, wherein the first block floating means includes
means for selecting the sub block floating coefficients of the sub blocks corresponding to the block having the length determined by the block size signal,
means for choosing the smallest of the selected sub block floating coefficients as a first block floating coefficient, and
means for normalizing, in response to the first block floating coefficient, each sample in the block having the length determined by the block size signal.

10. The apparatus of claim 1, wherein the means for adaptively quantizing each second block floating processed band includes a means, receiving the spectral coefficients, for reversing the first block floating.

11. An data exander apparatus for providing an expanded output signal by expanding a compressed digital signal generated from an input digital signal that includes plural samples by a data compression process, the process including the steps of:
dividing the input digital data into blocks, each block including plural samples,
applying first block floating to each block to provide a first block floating processed block,
orthogonally transforming each first block floating processed block to provide spectral coefficients,
dividing the spectral coefficients into bands, each band including at least one spectral coefficient,
applying second block floating to each band to provide a second block floating processed band, and
adaptively quantizing each second block floating processed band to provide a quantized band and providing the quantized bands as the compressed digital signal, the decoding apparatus comprising:
a means for receiving the compressed digital data and for dequantizing the quantized bands to provide plural second block floating processed bands;
a means for reversing the second block floating applied to each second block floating processed band to provide plural spectral coefficients;
a means for inversely orthogonally transforming the spectral coefficients to provide a first block floating processed block of plural samples; and
a means for reversing the first block floating applied to the first block floating processed block to provide a block of the output signal.

12. The data expander apparatus of claim 11, wherein,
(a) in the process for generating the compressed digital signal,
(1) the step of applying first block floating additionally includes the step of providing a first block floating coefficient for each block;
(2) the step of applying second block floating additionally includes the step of providing a second block floating coefficient for each band; and
(3) the process additionally the steps of:
(i) providing summed block floating coefficients by adding the first block floating coefficient for a block to the second block floating coefficient for each band provided by orthogonally transforming the block after first floating processing; and
(ii) providing the summed block floating coefficients as a summed block floating coefficient digital signal,
(b) the decoding apparatus additionally comprises:
a means for receiving the summed block floating digital signal;

a first block floating coefficient determining means for determining the first block floating coefficient from the summed block floating coefficients in the summed block floating coefficient digital signal; and a second block floating coefficient determining means for calculating the second block floating coefficient for each band from the first block floating coefficient and the summed block floating coefficients, and (c) in the decoding apparatus:
  (1) the means for reversing the second block floating reverses the second block floating for each band using the second block floating coefficient calculated for the band by the second block floating coefficient determining means, and
  (2) the means for reversing the first block floating reverses the first block floating using the first block floating coefficient determined by the first block floating coefficient determining means.

13. The data expander apparatus of claim 11, wherein each band includes a number of spectral coefficients, each block includes a number of samples, and the number of samples in each block is greater than the number of spectral coefficients in each band.

14. The data expander apparatus of claim 11, wherein the second block defloating means applies second block defloating using a second step size,
the first block defloating means reverses the first block floating in response to a first block floating coefficient, the first block floating coefficient having an effective number of bits,
the first block defloating means applies first block defloating using a first step size determined by changing the effective number the bits in the first block floating coefficient by one, and
the first step size is greater than the second step size.

15. A method for recording a data-compressed digital signal derived from an input digital signal including plural samples on a recording medium, the method including the steps of:
  dividing the input digital signal into blocks, each block including plural samples;
  applying first block floating to each block to provide a first block floating processed block;
  orthogonally transforming each first block floating processed block to provide spectral coefficients;
  dividing the spectral coefficients into bands, each band including at least one spectral coefficient;
  applying second block floating to each band to provide a second block floating processed band;
  adaptively quantizing each second block floating processed band to provide a quantized band;
  providing the quantized bands as the data-compressed digital signal; and
  recording the data-compressed digital signal on the recording medium.

16. The method of claim 15, wherein:
the step of applying first block floating additionally provides a first block floating coefficient for each block;
the step of applying second block floating additionally provides a second block floating coefficient for each band; and
the method additionally comprises the steps of:
  providing summed block floating coefficients as a summed block floating coefficient output signal by adding the first block floating coefficient for a block to the second block floating coefficient for each band provided by orthogonally transforming the block after applying first block floating, and
  including the summed block floating coefficient output signal in the data-compressed digital signal.

17. The method of claim 15, wherein:
the step of applying first block floating includes the steps of:
  dividing the input digital signal into sub blocks, and
  applying block floating to each sub block to provide a sub block floating coefficient for each sub block;
the method additionally includes the steps of:
  receiving the sub block floating coefficients, and
  generating a block size signal in response to an increase above a threshold value in the sub block floating coefficients of plural sub blocks; and
in the step of dividing the input digital signal into blocks, the input digital signal is divided into blocks having a length determined by the block size signal.

18. The method of claim 15, wherein, in the step of recording the data-compressed digital signal on the recording medium, the recording medium is an optical disc.

19. The method of claim 15, wherein, in the step of recording the data-compressed digital signal on the recording medium, the recording medium is a semiconductor memory.

20. The method medium of claim 15, wherein, in the step of recording the data-compressed digital signal on the recording medium, the recording medium is a magnetic tape.

* * * * *